United States Patent [19]

Bando et al.

[11] Patent Number: 5,099,409
[45] Date of Patent: Mar. 24, 1992

[54] SEMICONDUCTOR ELECTRIC POWER CONVERSION SYSTEM ENABLING FAULT AND/OR OVERTEMPERATURE PROTECTION

[75] Inventors: Akira Bando; Chikara Tanaka; Keiji Saito, all of Hitachi; Tadao Kawai, Katsuta; Eizo Kita, Kyoto; Keiichi Mitsuhashi, Hikone; Yasuteru Ohno, Kobe; Hiroto Nakagawa, Mishima, all of Japan

[73] Assignees: Hitachi, Ltd., Chiyoda; The Kansai Electric Power Co., Inc., Osaka, both of Japan

[21] Appl. No.: 496,302

[22] Filed: Mar. 20, 1990

[30] Foreign Application Priority Data

Mar. 20, 1989 [JP] Japan .................................. 1-68391

[51] Int. Cl.⁵ ...................... H02H 7/127; H02M 7/155
[52] U.S. Cl. .......................................... 363/54; 363/68; 363/81
[58] Field of Search ........................ 363/54, 68, 81, 87

[56] References Cited

U.S. PATENT DOCUMENTS 4,429,357  1/1984  Hausler et al. ..................... 363/68

FOREIGN PATENT DOCUMENTS 42627  4/1979  Japan .................................... 363/54
65273  4/1982  Japan .................................... 363/54
19160  2/1983  Japan .................................... 363/54

Primary Examiner—William H. Beha, Jr.
Attorney, Agent, or Firm—Antonelli, Terry, Stout & Kraus

[57] ABSTRACT

An improved electric power conversion system comprising a multi-phase bridge circuit composed of semiconductors such as thyristors and an associated firing circuit. It is so constructed that: if the AC input current Iac flowing in the bridge circuit is equal to or larger in value than the DC output current Idc flowing out of the bridge circuit, it will be decided that an inner defect or fault is caused, and possible expansion of inner defect will be prevented by disabling the firing circuit to extinguish the thyristors in the bridge circuit, and if the AC input current Iac is smaller than the DC output current Idc in value, the bridge is permitted to continue the operation of power conversion, thus eliminating unnecessary interruption which otherwise would be caused by exterior disturbances. Also, an improved electric power conversion system may be equipped with a device to prevent an adverse effect from being caused by abnormal rise of thyristors' temperature.

10 Claims, 15 Drawing Sheets

SEMICONDUCTOR ELECTRIC POWER CONVERSION SYSTEM ENABLING FAULT AND/OR OVERTEMPERATURE PROTECTION

BACKGROUND OF THE INVENTION a. Field of the Invention

The present invention relates to an electric power conversion system using semiconductors, which is used in the field of power system, electric railway, large-scaled plant or the like, particularly for AC-to-DC conversion, DC power transmission or frequency conversion system in those fields. It is particularly suitable for use in a variable-speed electric generator-and-motor which is required to continue its running to the limit even in case where AC input voltage is unstable owing to abnormal conditions in the electric power system.

b. Background Art

A line commutation type semiconductor electric power conversion system is used in the hope of improving the stability of post-conversion power supply. As a problem, however, the thermal capacity of power semiconductors such as thyristors is small, compared with the thermal capacity of transformers, electric machines and apparatuses, and therefore, it is most likely that a protection device for such electric power conversion system is designed to be very sensitive to abnormal conditions. As a result, even in case of appearance of minor disturbance on the power supply side, undesired interruption will be caused in the system using such semiconductor electric power converter, and therefore the stability of post-conversion power supply will be lowered.

In an attempt to solve such problem Japanese Patent Application Laid-Open (KOKAI) No. 63-52699 proposed a semiconductor electric power conversion system as shown in FIG. 14.

FIG. 14 shows a conventional electric power conversion system as comprising transformer 2 connected to power system line 1, three-phase bridge circuit 3 connected to transformer 2, current transformers 5 to detect three-phase input currents; current transformers 6 to detect DC output current; input current detection circuit 7 connected to current transformers 5; absolute value arithmetic operation circuit 8 connected to a joint between input current detection circuit 7 and current transformer 6; differential current detector 9 connected to absolute value arithmetic operation circuit 8; overcurrent detector 10 connected to input current detection circuit 7; and means 11 connected both to differential current detector 9 and overcurrent detection 10 for making a decision as to whether running be continued or not.

The AC input current Iac from input current detection circuit 7 will be equal to the DC output current Idc from DC current transformer 6 during a normal operation. A signal representing the difference ΔI between these currents Iac and Idc is rectified in absolute value arithmetic operation circuit 8, and the rectified signal ΔI is directed to differential current detector 9. On the other hand, the signal representing the AC input current Iac is directed to overcurrent detector 10. An apparatus 11 for making a decision as to whether or not the power conversion system is allowed to continue its running, has the functions as shown in FIG. 16.

In FIG. 16 if the level of the signal OC appearing at the output terminal of overcurrent detector 10 is "0" (the level of the signal being "1" upon detection of overcurrent) (Step 100), it is decided that the DC output current from three-phase bridge 3 is of normal value, and that nothing is wrong (Step 104), and then operation continuing instructions GO1 will be dispatched (step 107), allowing the power conversion system to continue its running.

In case where a return is made from suppression control to normal operation even if the signal OC appearing at the output terminal of overcurrent detector 10 is "0", return-to-normal operation processings will be required (Step 109). First, a decision will be made as to whether overcurrent suppression control instructions G02 were dispatched before (Step 108). In the affirmative the return-to-normal operation processings will be performed, and then operation continuing instructions GO1 will be dispatched (Step 107).

The contents of the return-to-normal operation processings (Step 109) are as follows i) While the situation remains as it was prior to detection of overcurrent, a part of the arithmetic operation of control means (not shown) for controlling the gate electrodes of the thyristors in the three-phase bridge circuit, is initialized on the basis of the circuit currents at present.

ii) Initialization is made by teaching the control means the current firing condition of forward or backward thyristors TYS.

On the other hand, if the signal OC appearing at the output terminal of overcurrent detector 10 is "1", a decision will be made as to whether ΔI is within an allowance or not (Step 101). If ΔI is within allowance K1, and if nothing is wrong with the generator, it is decided that the cause for the overcurrent is a power system fault or malfunction of switching devices in other power conversion systems (Step 110 and 103), and then overcurrent suppression control instructions G02 will be dispatched (Step 106).

In response to the overcurrent suppression control instructions G02, shortcircuiting switch TYS4 is fired, thereby suppressing the current, which otherwise, would be increased, in the three-phase bridge circuit. Also, the signal representing the overcurrent suppression control instructions G02 will be stored, for instance by using a flip-flop circuit (not shown) to prepare for the return-to-normal operation proceedings (Step 109).

In case where the difference ΔI represented by the signal appearing at the output terminal of absolute value arithmetic operation circuit 8, is above the value of allowance K1, it will be decided that it is an overcurrent which was caused by inner faults or defects of the three-phase bridge circuit 3 (Step 102), and then emergent interruption command ST will be dispatched (Step 105).

In response to the emergent interruption command ST the firing signals will be prevented from being directed to the thyristors TY1 to TY6 in the three-phase bridge circuit 3.

It is possible that the difference ΔI remains within allowance K1 even in case of inner defects in other power conversion systems, and therefore, a decision will be made as to whether the defect is internal or external one after the decision of Step 101 (Step 110). If it should be found to be an inner defect (Step 111), no overcurrent suppression control will be carried out. Instead, as is the case with the inner defect of the power conversion system, emergent interruption instructions will be dispatched (Step 105).

The above described prior art semiconductor electric power conversion system is not satisfactory in detection of abnormal conditions because of no capability of making a distinction between abnormal conditions caused by defects in the three-phase bridge circuit and associated parts, and abnormal conditions caused by commutation failures in the three-phase bridge circuit, which commutation failures may be caused by disturbances on the AC power supply side or on the DC power output side. This results in delay in detection of inner defective conditions, and emergent interruption of power conversion is liable to take place even at the time of appearance of abnormal conditions caused by external disturbances. Accordingly, the reliance of operation is lowered.

SUMMARY OF THE INVENTION

One object of the present invention is to provide an improved semiconductor power conversion system which is quick in detecting inner defective conditions, thus preventing expansion of adverse effect caused thereby.

Another object of the present invention is to provide an improved semiconductor power conversion system which is insensitive to abnormal conditions such as commutation failures caused by external disturbances, thereby permitting continuous operation to the limit below which the power semiconductors and other parts can work without being yielded, accordingly improving the reliance of operation.

Another object of the present invention is to provide an improved semiconductor power conversion system which is capable of resuming operation within possible shortest period even in case that operation is interrupted owing to destructive rise of the junction temperature of the three-phase bridge semiconductors as a result of commutation failures, which are caused by external disturbances.

In order to attain these objects an improved semiconductor power conversion system according to the present invention comprises means for making a decision of abnormal conditions being caused by inner defects when the AC input current is larger than the DC output current in value in the bridge circuit, which constitutes a power converter, and means responsive to such a decision for interrupting operation immediately.

Also, an improved semiconductor power conversion system according to the present invention comprises means for making a decision of appearance of commutation failures when the DC output current is larger than the AC input current in value in the bridge circuit; means responsive to such a decision for continuing operation to the temperature limit of the bridge elements; and means responsive to the temperature rise above the temperature limit for closing an associated shortcircuit switch, and at the same time, preventing the firing of the bridge elements, thereby permitting continuous operation in case of abnormal conditions caused by external disturbances.

Particularly, a semiconductor power conversion system which comprises a bridge circuit including semiconductor control elements symmetrically connected in phase relationships, each element having controllable firing function and counter-current block characteristic; and a gate electrode control to dispatch firing instructions to selected semiconductor control elements, is improved according to the present invention in that it further comprises a protection unit which includes: means for determining AC input current value and DC output current value in said bridge circuit; means for making a comparison between the absolute value of the AC input current and the DC output current for making a decision as to which is larger in which phase; and means for dispatching interruption instructions to said bridge circuit when the absolute value of the AC input current is larger than the DC output current.

In another aspect of the present invention it further comprises a protection unit which includes a short-circuit switch on the DC output side of a bridge circuit; means for determining AC input current value and DC output current value in said bridge circuit; means for making a comparison between the absolute value of the AC input current and the DC output current for making a decision as to which is larger; means for permitting continuous operation of said bridge circuit so far as the presumable temperature of the semiconductor control elements of said bridge circuit remain below a predetermined limit in case where the DC output current is larger than the absolute value of the AC input current; and means responsive to the presumable temperature rise above the predetermined limit for closing said short-circuit switch, and at the same time, dispatching interruption instructions to said gate electrode control.

The operation of an improved power conversion system using a three-phase bridge circuit is described below:

The three-phase bridge circuit is shown in FIG. 17. Current will flow through selected two arms (TY1 & TY2), (TY2 & TY3), (TY3 & TY4), (TY4 & TY5), (TY5 & TY6), and (TY6 & TY1).

The AC input current Iac is the maximum selected among the absolute values In, Iv and Iw, and therefore, in FIG. 17 Iac=Il=Iu=−Iw. On the other hand, the DC output current Idc=Il. Thus, the AC input current Iac is equal to the DC output current Idc.

Assume that current commutation proceeds from TY1 to TY3. Then, In=Il−It; Iv=It; and Iw=−Il. Therefore, the AC input current value Iac=|Iw|=Il. On the other hand, the DC output current value Idc=Il. Thus, the AC input current Iac is equal to the DC output current Idc, too.

As seen from the above, in the normal operation inclusive of commutation, the AC input current Iac is equal to the DC output current Idc. Therefore, the difference between these input and output currents remain zero at all the time, excluding errors, if any in measurement.

As regards abnormal conditions in the power conversion circuit, commutation failures will be caused by DC transient current or AC voltage drop even if there are no internal defects. These commutation failures which are caused by external factors, will disappear when such external disturbances have been reduced, and then normal commutation will be caused.

FIG. 19 shows how electric currents flow in such commutation failure. TY6 is fired prior to completion of commutation from TY3 to TY5, and commutation from TY4 to TY6 starts.

On that occasion Iu=−Il+If; Iv=Il−If; and Iw =It. Thus, the absolute value of every current is less than Il, and therefore there will be a difference between AC input current Iac and DC output current Idc. In FIG. 19 the commutating current If will come close to Il whereas the commutating current It reduces to zero again because the voltage in "v" phase rises above the voltage in "w" phase. As a result the AC side will be open, thereby causing Iu, Iv and Iw to be zero. Therefore, AC input current Iac will be zero.

As a result a short circuit will be provided by the conductive thyristors TY3 and TY6 on the DC side as seen from FIG. 20, and therefore, the DC current Idc remains to be Il, and cannot be zero.

As may be understood from the above, during commutation failure AC input current Iac cannot be equal to DC output current Idc. Specifically, DC output current Idc is larger than AC output current Iac (Idc > Iac), and DC output current Idc cannot be larger than AC output current Iac (Idc < Iac) for the following reasons:

Assume that currents $I_1$ to $I_6$ flow in TY1 to TY6 respectively in FIGS. 17 to 20. These currents will be larger than zero because of the counter-current block characteristics of the thyristors. Also, following equations 1 to 5 will be held unless an extra circuit is provided as a result of inner shortcircuiting in the three-phase bridge circuit.

$$Iu = I_1 - I_4 \quad (1)$$

$$Iv = I_3 - I_6 \quad (2)$$

$$Iw = I_5 - I_2 \quad (3)$$

$$Il = I_1 + I_3 - I_5 \quad (4)$$

$$Il = I_2 + I_4 + I_6 \quad (5)$$

Equations (6) to (8) are derived from Equations (1) to (3).

$$|Iu| \leq I_1, \ ''Iu'' \leq I_4 \quad (6)$$

$$|Iv| \leq I_3, \ |Iv'| \leq I_6 \quad (7)$$

$$|Iw| \leq I_5, \ |Iw'| \leq I_2 \quad (8)$$

Equations (9) and (10) are derived from Equations (4) to (5).

$$I_1 \leq Il, \ I_3 \leq Il, \ I_5 \leq Il \quad (9)$$

$$I_2 \leq Il, \ I_4 \leq Il, \ I_6 \leq Il \quad (10)$$

Following equation is derived from Equations (6) (9) and (10). $|Iu| \leq Il$

Likewise, following equation is derived from Equations (7), (9) and (10). $|Iw| \leq Il$ Also, following equation is derived from Equations (7), (9) and (10). $|Iw''| \leq Il$ Thus, the absolute value of the three-phase current Iu, Iv or Iw is below Il. DC output current Idc is equal to Il, and AC input current Iac, which is the maximum of all three-phase current values, is below Il.

In case where AC input current Iac is larger than Idc, the assumption on which the above calculations are based on, will not be held. Specifically, there will be either of following situations (A) and (B):

(A) Any one of $I_1$ to $I_6$ is negative. There appears a shortcircuit across a selected arm of the bridge circuit.

(B) Any one of Equations (1) to (5) is not held. There appears an extra circuit in the bridge circuit.

These situations indicate that there is an inner defect, and therefore emergent interruption of the operation of the bridge circuit, is required. Differences, if any between AC input current Iac and DC output current Idc, along with sign are detected, and in case where Iac is found to be larger than Idc, the protection apparatus is permitted to interrupt the operation of the power conversion system, and the internal defect can be detected quickly because of no necessity of logic circuits with regard to other apparatuses. Conversely, in case where Idc is found to be larger than Iac, current flows back from the DC side as is the case with the commutation failure A shortcircuit thyristor switch is provided across the bridge circuit on the DC side to permit the back-flow of DC output current to bypass the bridge circuit by firing the switch, thus assuring that reliable current protection is attained.

BRIEF DESCRIPTION OF THE DRAWINGS

The present invention will be better understood from the following description of preferred embodiments, which are shown in accompanying drawings.

PREFERRED EMBODIMENTS

The present invention is described below as being applied to the one using a three-phase bridge, but it should be understood that this is not limitative.

Figure 1:
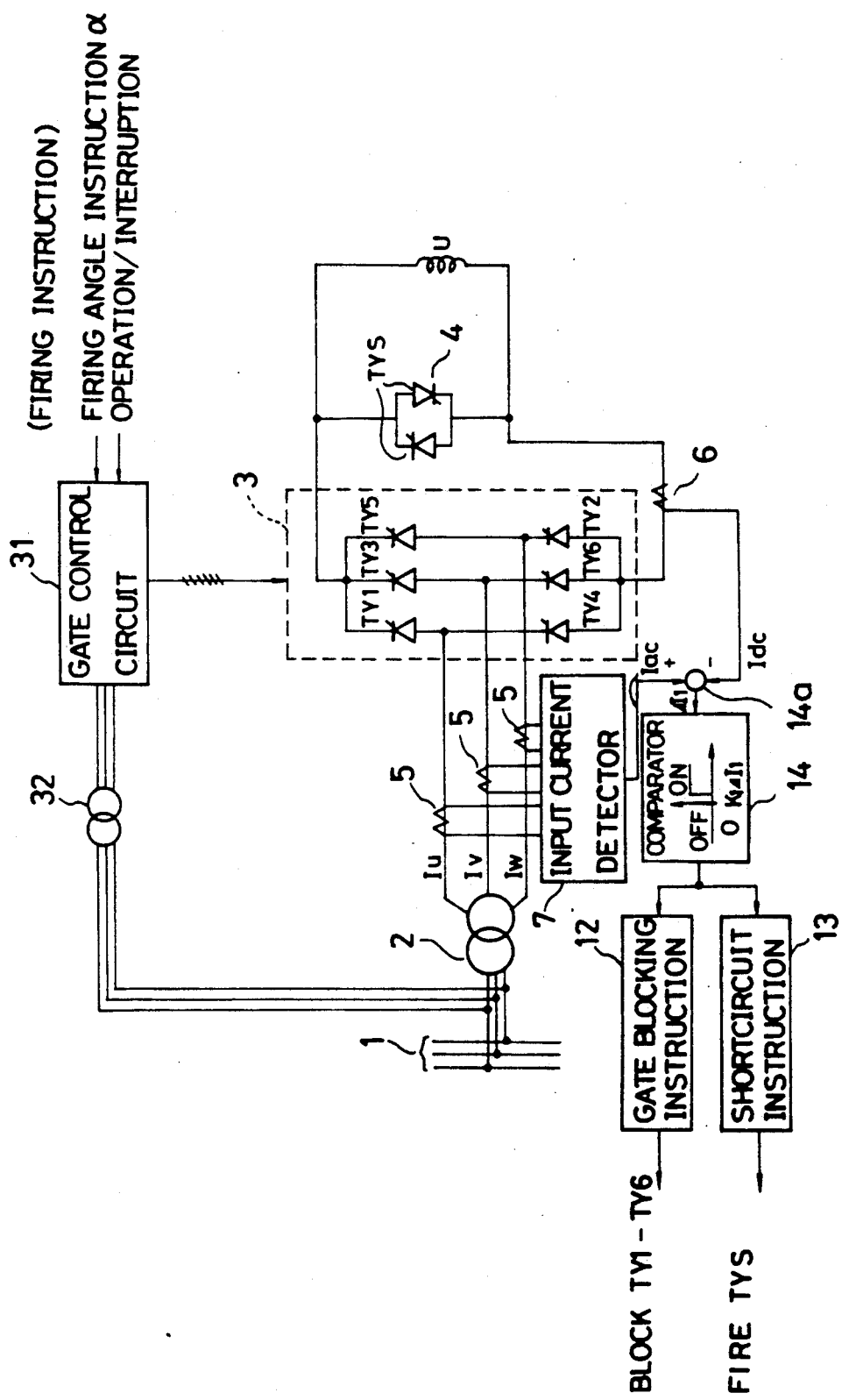
FIG. 1 shows the structure of a semiconductor electric power conversion system according to a first embodiment of the present invention.

FIG. 1 shows a semiconductor electric power conversion system according to a first embodiment of the present invention.

Figure 14:
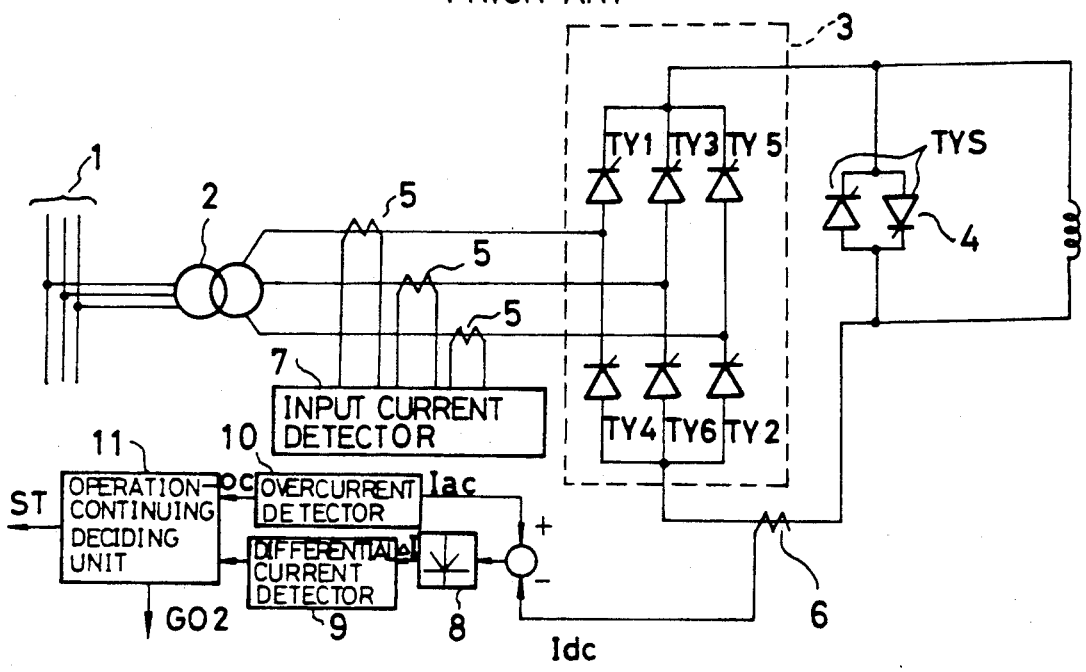
FIG. 14 shows the structure of a conventional semiconductor electric power conversion system.

The AC power supply system 1 supplies the three-phase bridge 3 of the semiconductor electric power conversion system of FIG. 1 with electric power via a power transformer 2 as is the case with the conventional semiconductor electric power conversion system of FIG. 14.

The three-phase bridge has six thyristors TY1 to TY6 (hereinafter abbreviated as TY) connected in the form of bridge.

The bridge circuit 3 has a thyristor short-circuiting switch 4 (hereinafter abbreviated as TYS) connected across the DC output terminals of the bridge 3. The gate electrodes of TY1 to TY6 are connected to a gate control circuit or firing instruction circuit 31 for controlling the firing of selected thyristors.

An AC signal will be directed to the gate control circuit 31 via a synchronous transformer 32. Also, firing angle instructions and operation start/interruption instructions will be directed to the gate control circuit 31 as control signals.

As in FIG. 14, the protection apparatus comprises current transformers 5 for detecting three-phase input current values; DC current transformer 6 for detecting a DC output current value; and input current detector 7 for determining the absolute values Iac of the three-phase input current values and for selecting and outputting the maximum value among these absolute values.

The semiconductor electric power conversion system according to the first embodiment further comprises deviation detector circuit 14a for determining the difference between the DC current value Idc and the absolute value Iac of the AC input current value; comparator 14 for making a decision as to which sign the deviation has, negative or positive, and for comparing the deviation with a predetermined reference value and making a decision as to whether instructions of prevention of firing TY1 to TY6 and/or instructions of closing of short-circuit switch of thyristor TYS4 should be dispatched or not; gate-blocking instruction or firing prevention circuit 12 responsive to the decision by comparator 14 for directing the firing prevention instructions to gate control circuit 31 as signals for effecting interruption of thyristors TY1 to TY6, and short-circuit instruction circuit 13 responsive to the decision by comparator 14 for directing the short-circuit instructions to the short-circuit switch TYS4.

Figure 15:
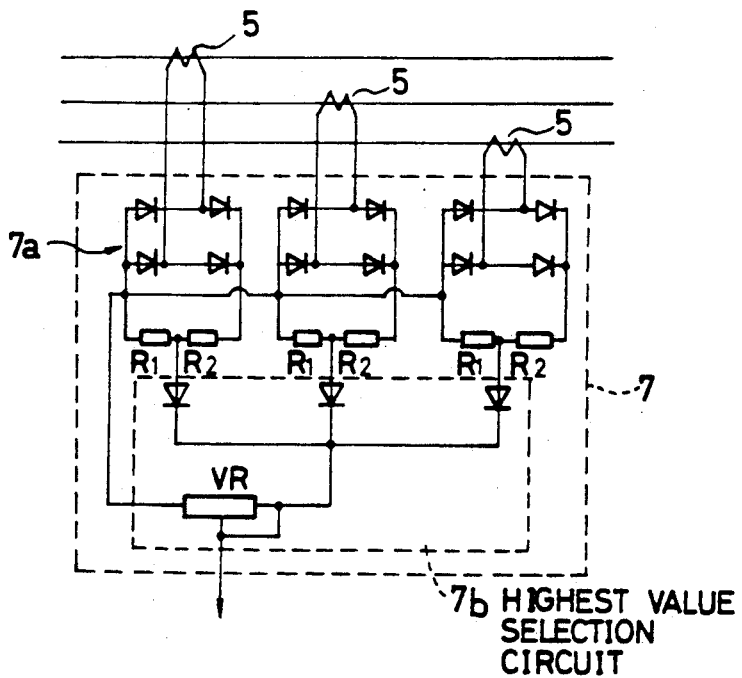
FIG. 15 is a circuit diagram of an input current detection circuit.
Figure 16:
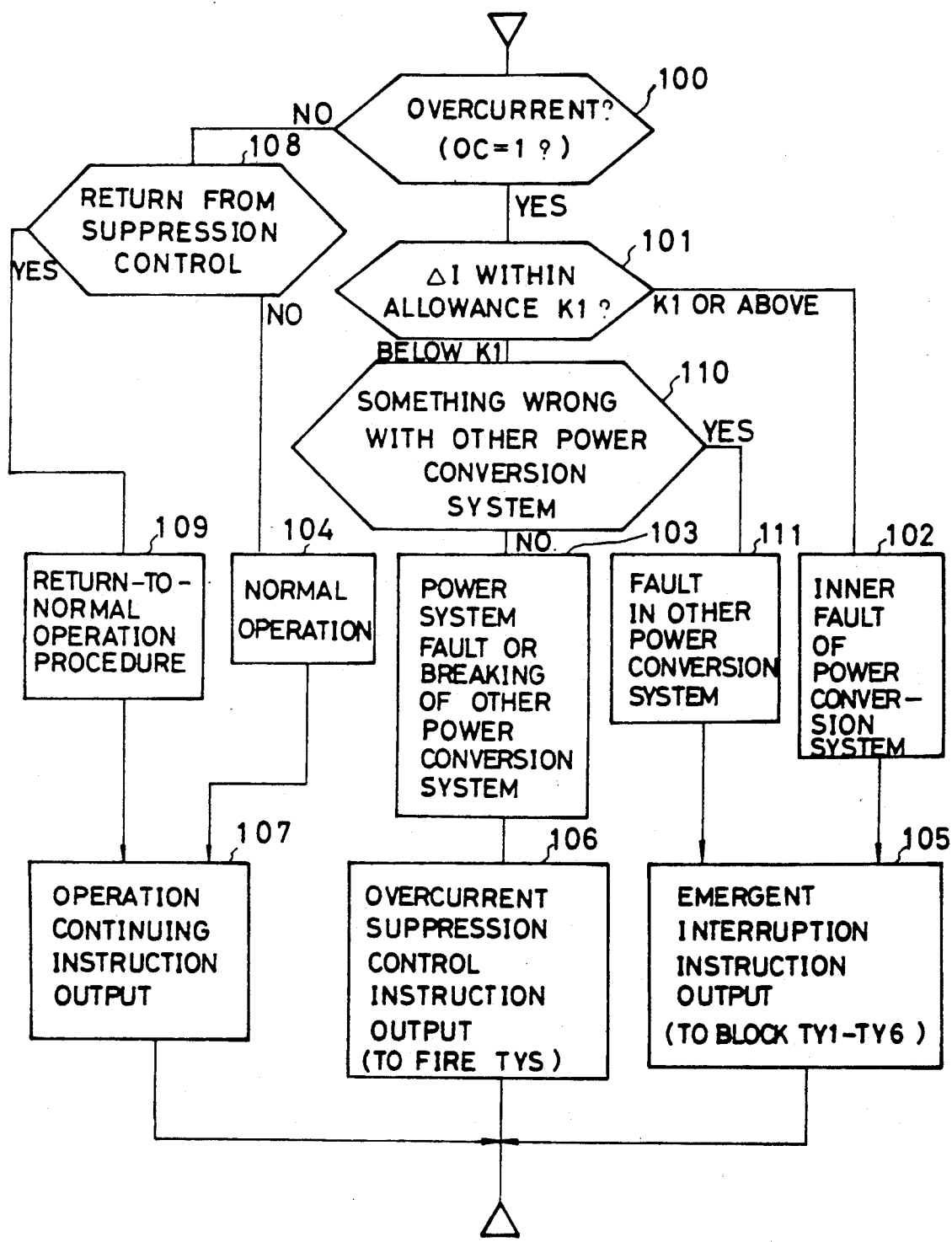
FIG. 16 is a flow chart representing the proceedings of the arithmetic operation in the conventional semiconductor electric power conversion system.
Figure 17:
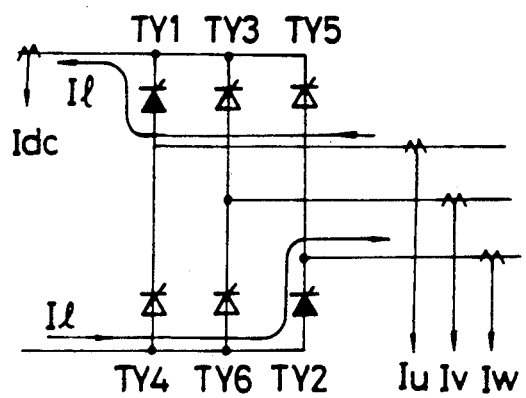
FIG. 17, 18, 19 and 20 show distribution of currents flowing in the three-phase bridge circuit for the sake of description of the operation of the semiconductor electric power conversion system according to the present invention.
Figure 18:
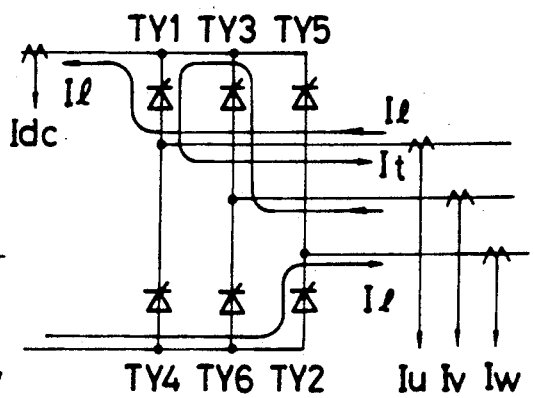
Figure 19:
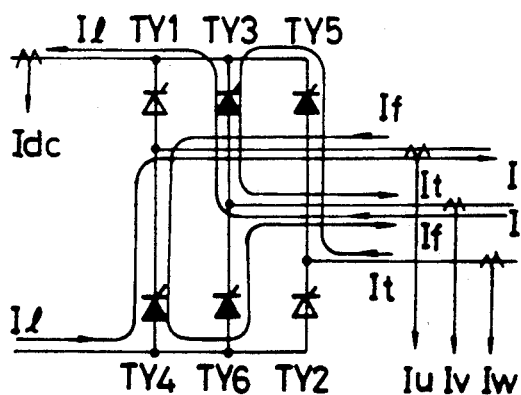
Figure 20:
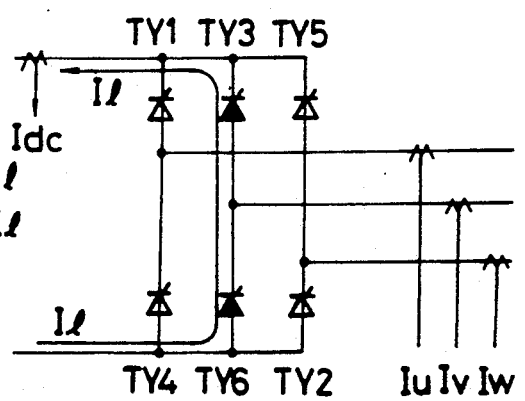

The input current detector circuit 7 has a structure as shown in FIG. 15 including rectifier circuits 7a connected to current transformers 5 for outputting signals representing absolute values of the AC current inputs, and a highest value selection circuit 7b including diodes. It is possible that transient DC current flows in current transformers 5. Preferably, optical current transformers may be used.

Comparator 14 is the one with polarity or sign, and it functions to permit gate-blocking-instruction circuit 12 to prevent gate signals from being directed to TY1 to TY6 when the current deviation $\Delta I_1$ is not below a predetermined value K1 and at the same time, comparator 14 functions to make a decision as to whether short-circuit instruction circuit 13 is permitted to turn thyristor shortcircuit switch 4 on. Comparator 14 has an analogue-to-digital convertor for converting input signals to digital signals at its input section, and a digital processor for processing the converted signals at this subsequent section. Also, comparator 14 functions as a relay for effecting necessary control on gate-blocking instruction circuit 12 and shortcircuit instruction circuit 13.

Figure 2:
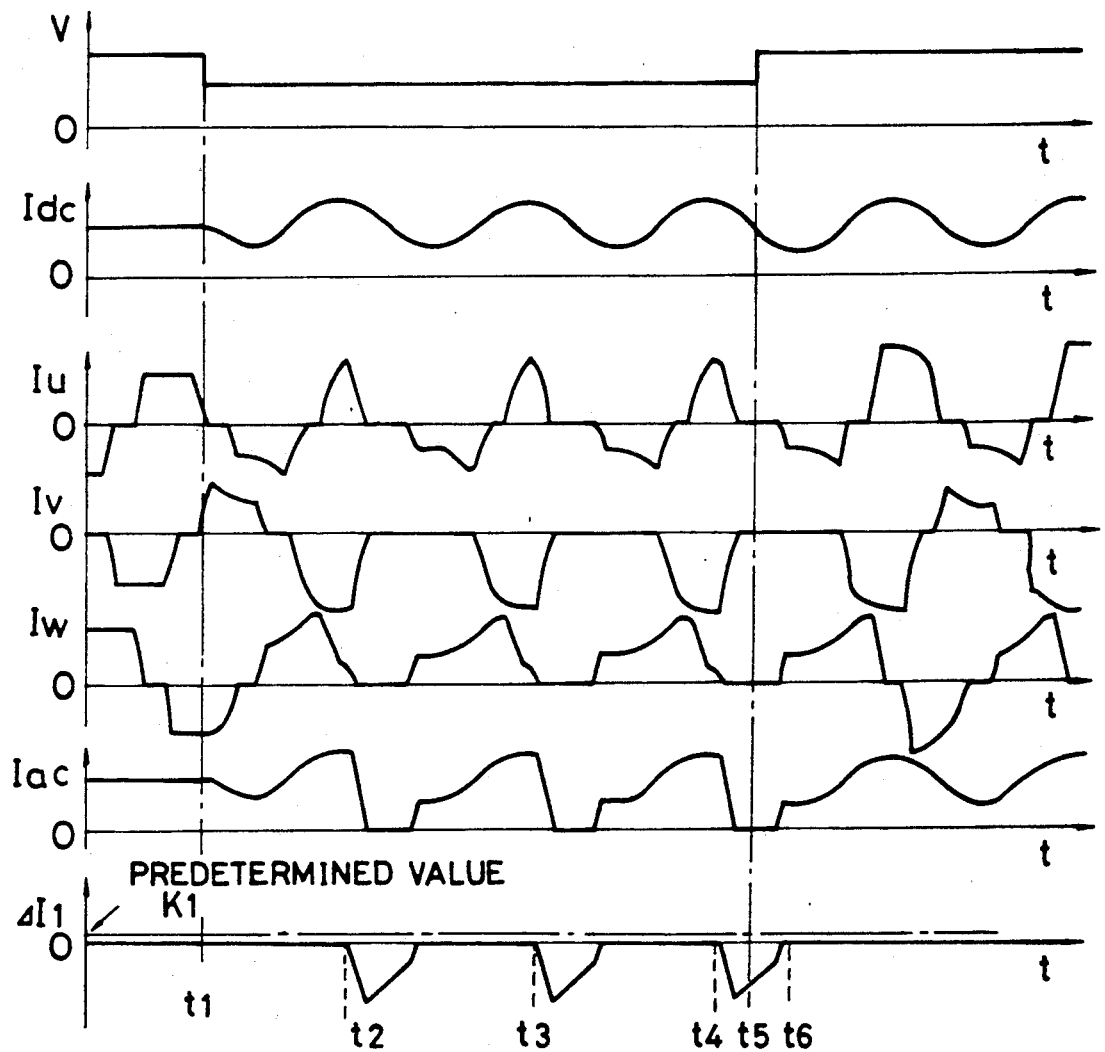
FIGS. 2, 3 and 4 waveforms of signals appearing at different positions in the semiconductor electric power conversion system according to the first embodiment.

Referring to FIG. 2, the operation of the system upon decrease of AC voltage across three-phase bridge circuit 3 is described below.

The predetermined value K1 is selected to prevent any malfunctions of comparator 14, which malfunctions otherwise, would be caused by noise signals or errors in measurements in the pre-stages of the power conversion system. Thus, the value K1 must be selected to be appropriate for a particular comparator actually used. This is the same as K2, which will be described later.

FIG. 2 represents the situation in which voltage V lowers for the period running from $t_1$ to $t_6$, and transient electric current Idc appears on the DC side.

Commutation failure in cause at time $t_2$, $t_3$ and $t_4$ As a result the deviation $\Delta I_1$ varies in the negative or minus side. Therefore, comparator 14 does not work, and no protection is effected. At time $t_6$ the voltage V in restored to the original value, and commutation failures disappear. Thus, normal operation resumes.

Figure 3:
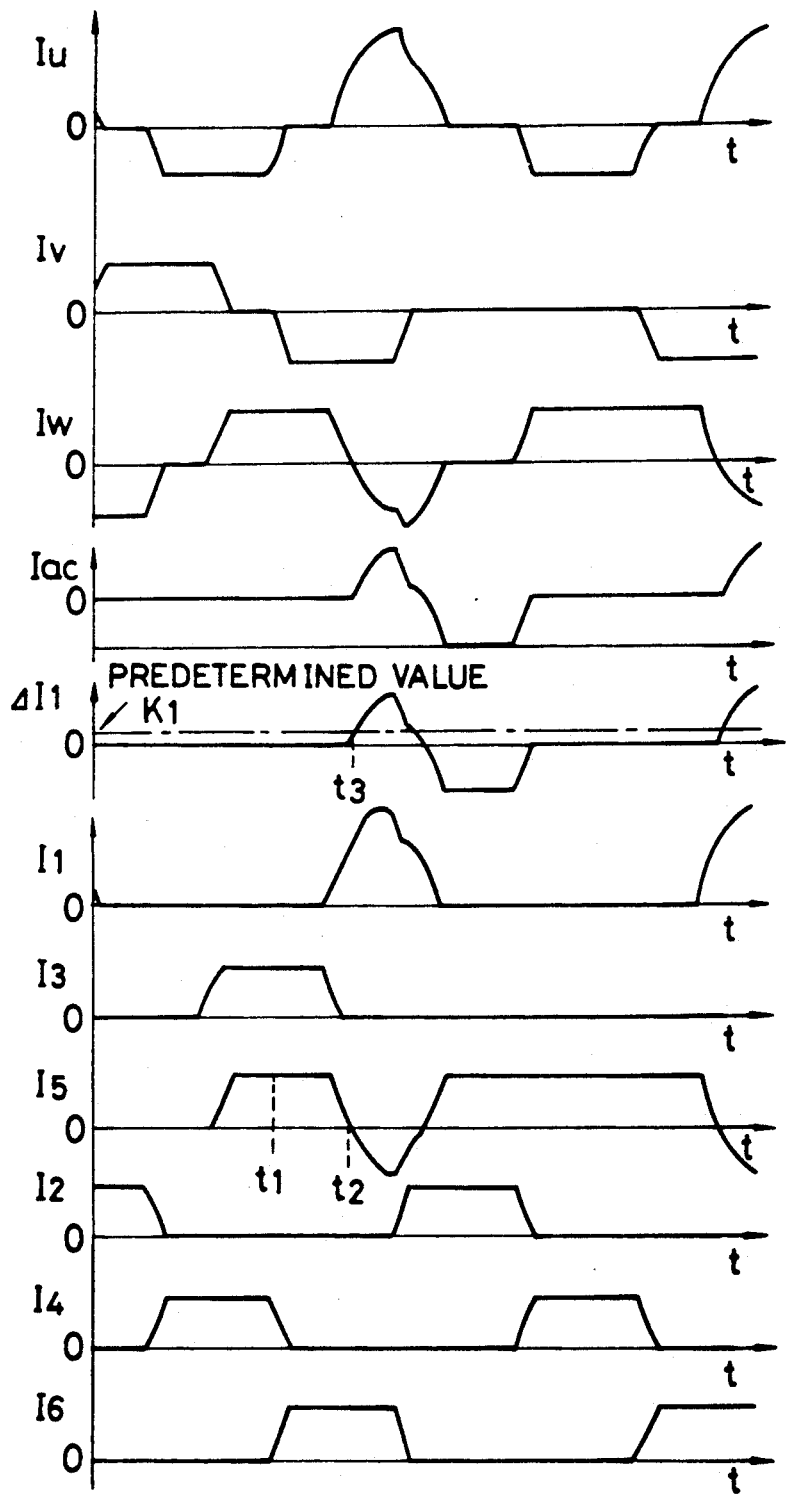

FIG. 3 shows that a shortcircuit appears across a selected arm of the bridge circuit at time $t_1$, and that protection operation is effected for such an inner defect or fault. In this figure $I_1$ to $I_6$ indicate the arm currents flowing through TY1 to TY6.

Specifically, the arm containing TY5 is shortcircuited, and the electric current begins to flow in the opposite direction at time $t_2$, and $\Delta I_1$ increases above the predetermined value K1 at time $t_3$. Then, comparator 14 functions as a relay.

Figure 4:
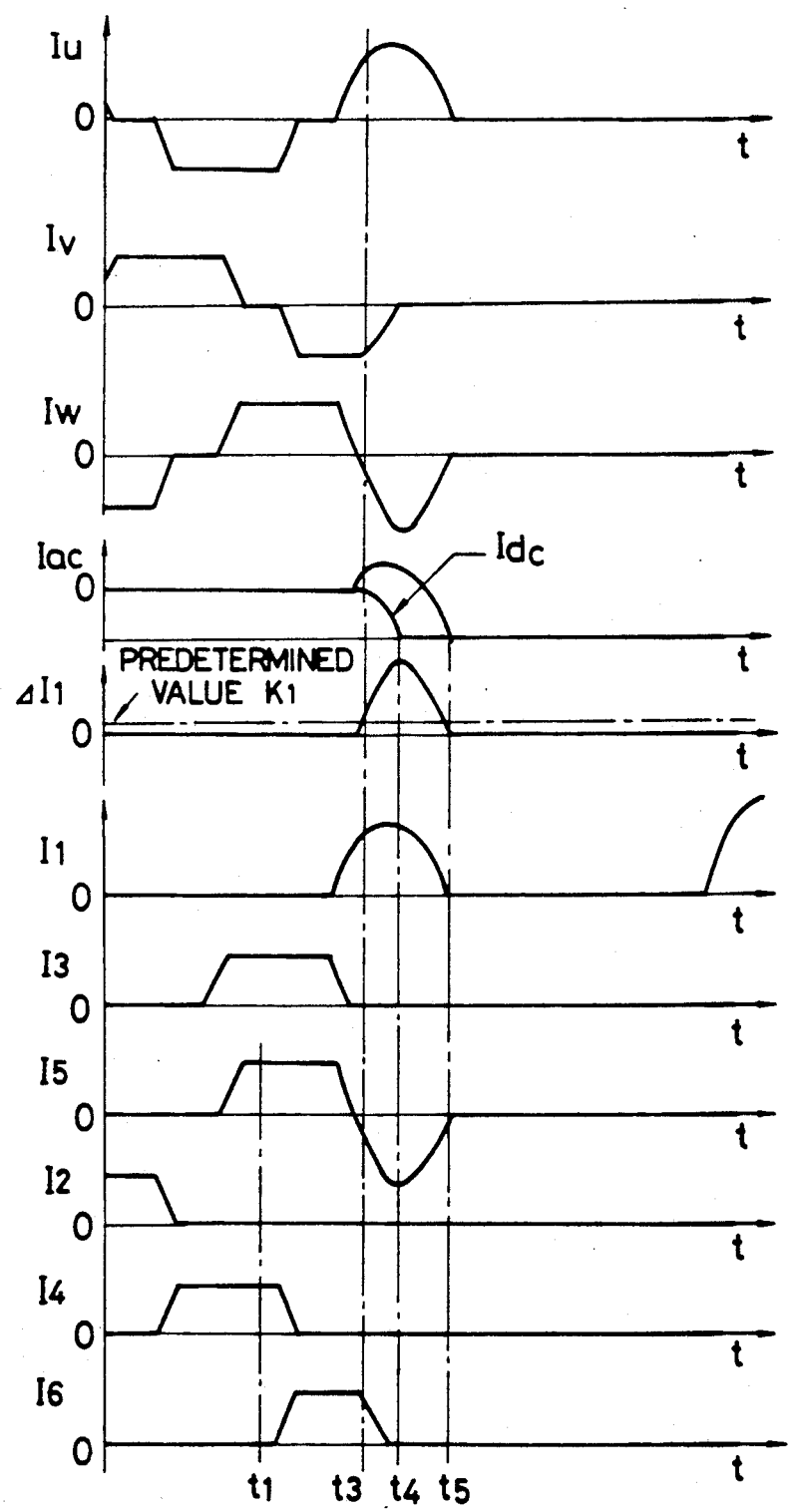

FIG. 4 shows that gate blocking circuit 12 and shortcircuit instruction circuit 13 work.

In this figure shortcircuit switch 4 is fired at time $t_3$, and the DC output current Idc flows through shortcircuit switch 4 at time $t_4$. All thyristors of three-phase bridge circuit 3 are extinguished at $t_5$, and then bridge circuit 3 stops working.

In this embodiment the abnormal condition caused by such exterior disturbances as seen in FIG. 2 can be distinguished from the abnormal condition caused by such inner defects as seen in FIG. 3 in terms of the signal appearing at the output of comparator 14. This permits simplification of the structure of the protection system.

The first embodiment just described and the second embodiment described below have shortcircuit instruction circuit 3, although it can be omitted.

Figure 5:
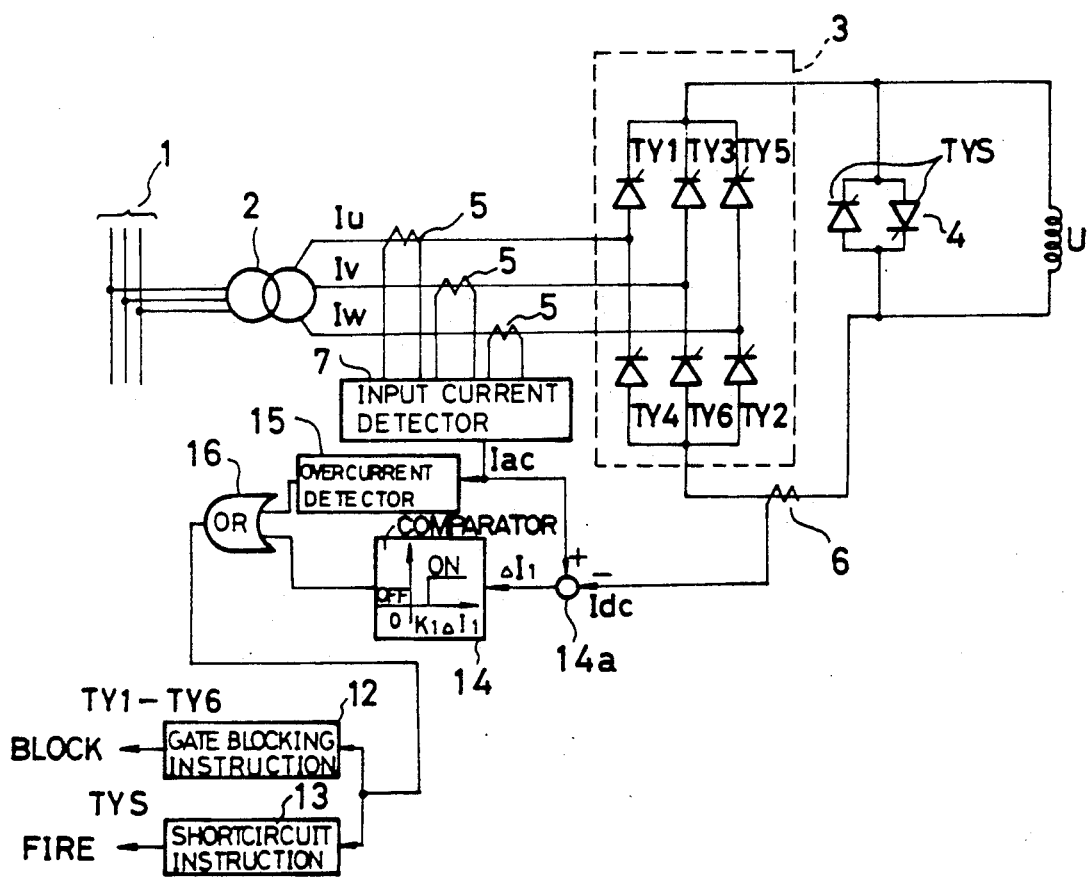
FIG. 5 shows the structure of a semiconductor electric power conversion system according to a second embodiment of the present invention.

FIG. 5 shows an electric power conversion system according to the second embodiment. It is different from the first embodiment only in that it has overcurrent detector 15 and OR circuit 16. Description of the same components as in the first embodiment is omitted. Synchronous transformer 32 and gate control 31 do not appear in FIG. 5. These units, although necessary in the second embodiment, are not shown for the sake of simplicity in the drawing. This is the case with the third and subsequent embodiments.

Overcurrent detector 15 has the same function as overcurrent detector 10, and is capable of outputting digital signals.

OR circuit 16 functions to provide at its output terminal a signal representing the logical sum of the output signal of overcurrent detector 15 and the output signal of comparator 14, and the signal is directed both to gate blocking circuit 12 and shortcircuit instruction circuit 13.

An overcurrent relay can be used as overcurrent detector 15. For example, in case where excessively heavy current suddenly flows in the AC input circuit or where the bus is shortcircuited on the AC side, post-protection can be performed, accordingly improving the reliance on the operation of the power conversion system.

Figure 6:
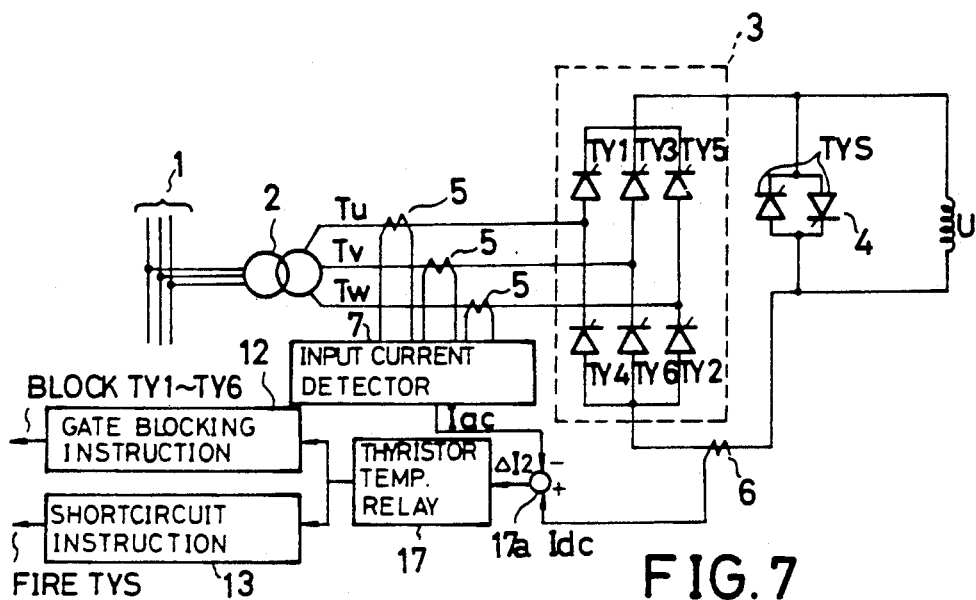
FIG. 6 shows the structure of a semiconductor electric power conversion system according to a third embodiment of the present invention.

FIG. 6 shows an electric power conversion system according to the third embodiment. It uses thyristor temperature relay 17 in place of comparator 14. Nothing else is different from the first embodiment. Description of the same components as in the first embodiment is omitted.

Figure 7:
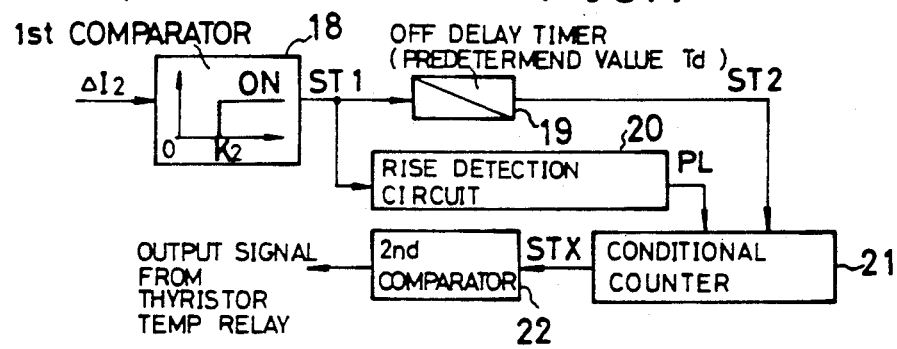
FIG. 7 shows the structure of a thyristor temperature relay.

As shown in FIG. 7, thyristor temperature relay 17 comprises first comparator 18, off-delay timer 19, rise detection circuit 20, conditional counter 21 and second comparator 22.

The sign of the signal $\Delta I_2$ which is directed to thyristor temperature relay 17, is opposite to that of the signal $\Delta I_1$ which is directed to comparator 14. This signal $\Delta I_2$ is a difference between the absolute value of the AC input current and the DC output current.

Thyristor temperature relay 17 functions to allow the power conversion system to continue its operation so far as the presumable thyristor temperature remains below a predetermined temperature in case where the DC output current is larger than the absolute value of the AC input current, and thyristor temperature relay 17 functions to close shortcircuit switch 4, and at the same time dispatch instructions for intermission of the firing of the thyristors in bridge circuit 3.

Conditional counter 21 will be reset when the signal ST2 appearing at the output terminal of off-delay timer 19 becomes Level 0, and conditional counter 21 functions to count the number STX of PL signals appearing at the output terminal of rise detector circuit 20 while the signal ST2 remains at Level High. This count STX represents the presumable value of the thyristor temperature.

The operation of this embodiment of thyristor temperature relay is described below with reference to FIG. 8, which shows signals appearing at different positions in the thyristor temperature relay of FIG. 7.

The signal ST1 appearing at the output terminal of comparator 18 will be Level High when the deviation $\Delta I_2$ increases above the predetermined value K2. This signal ST1 is directed both to off-delay timer 19 and rise detection circuit 20. The signal PL appearing at the output terminal of rise detection circuit 20 and the signal ST2 appearing at the output terminal of off-delay timer 19 are directed to conditional counter 21. Conditional counter 21 counts the signals PL while the signal ST2 are Level High. Then, the number STX of the signals PL thus counted is outputted from conditional counter 21.

When the count STX increases above the predetermined limit in comparator 22, comparator 22 makes a decision of the presumable thyristor temperature rising the predetermined limit to provide a signal representing detection of the abnormal condition. This signal appears at the output terminal of thyristor temperature relay 17 as abnormal condition detection signal.

Figure 8:
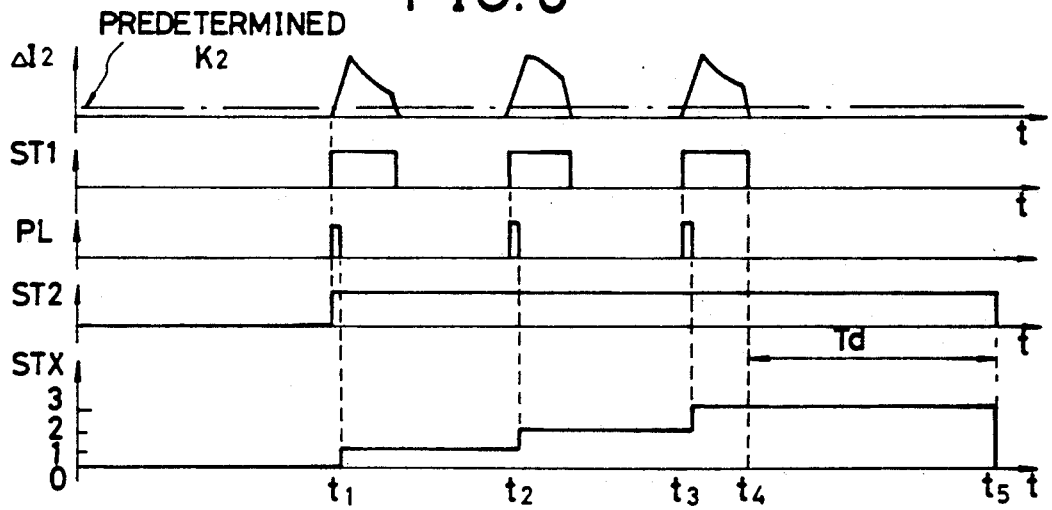
FIG. 8 shows waveforms of signals appearing at different positions in the thyristor temperature relay as shown in FIG. 7.

As seen from FIG. 8, the signal STX appearing at the output terminal of conditional counter 21 increases one by one at times $t_1$, $t_2$ and $t_3$. No signal PL appears after $t_4$, and the counter is reset at time $t_5$ after expiration of Td. Then, three-phase bridge circuit 3 is put in the same situation as prior to time $t_1$.

In this embodiment no arithmetic operation is required in determining thyristor's temperature, and accordingly the structure of thyristor temperature relay 17 can be advantageously simple, and the reliance of the apparatus will be increased.

Figure 9:
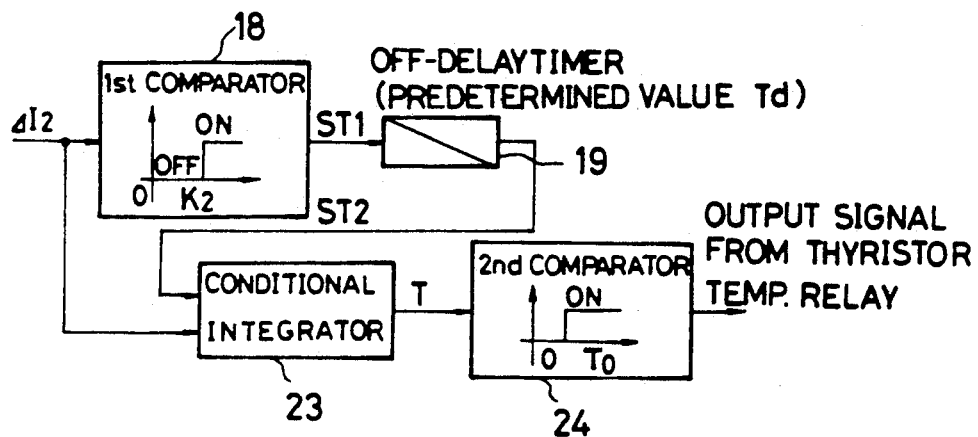
FIG. 9 is a block diagram representing the structure of another thyristor temperature relay.

FIG. 9 shows another example of thyristor temperature relay 17 as comprising first comparator 18, off-delay timer 19, conditional integrator 23 and second comparator 24.

Conditional integrator 23 performs an integral operation of $\Delta I_2$ only when the signal ST2 appearing at the output terminal of off-delay timer 16 is Level High to provide a signal T representing the result of the integration at the output terminal of conditional integrator 23. When the signal ST2 is Level 0, the output signal T will be reset to zero. The result of the integration represents the presumable thyristor's temperature.

Figure 10:
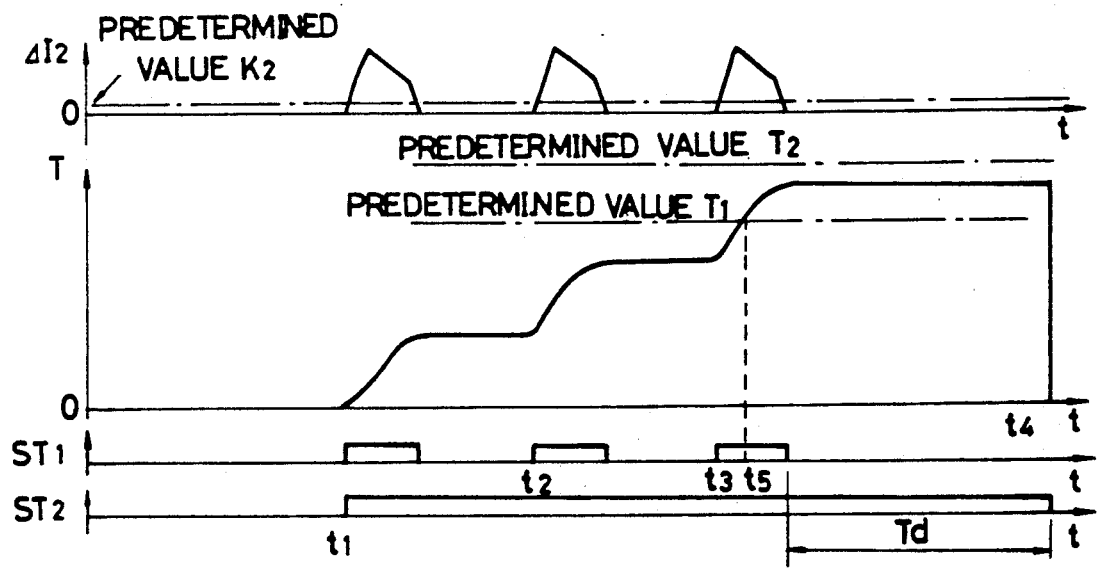
FIG. 10 shows waveforms of signals appearing at different positions in the thyristor temperature relay as shown in FIG. 9.

FIG. 10 shows waveforms representing the operation of the thyristor temperature relay.

The signal ST1 appearing at the output terminal of comparator 18 is Level High at times $t_1$, $t_2$ and $t_3$, and accordingly the signal T appearing at the output terminal of integrator 23 and representing the integration of $\Delta I_2$ increases in amplitude, and is reset at time $t_4$. If the predetermined limit of comparator 24 is for instance, $T_1$, the relay will work at time $t_5$.

The power conversion system according to this embodiment takes not only the number of commutation failures but also the current level into consideration, and therefore thyristor's temperature will be correctly presumed, and accordingly allowance for endurance can be advantageously reduced.

Figure 11:
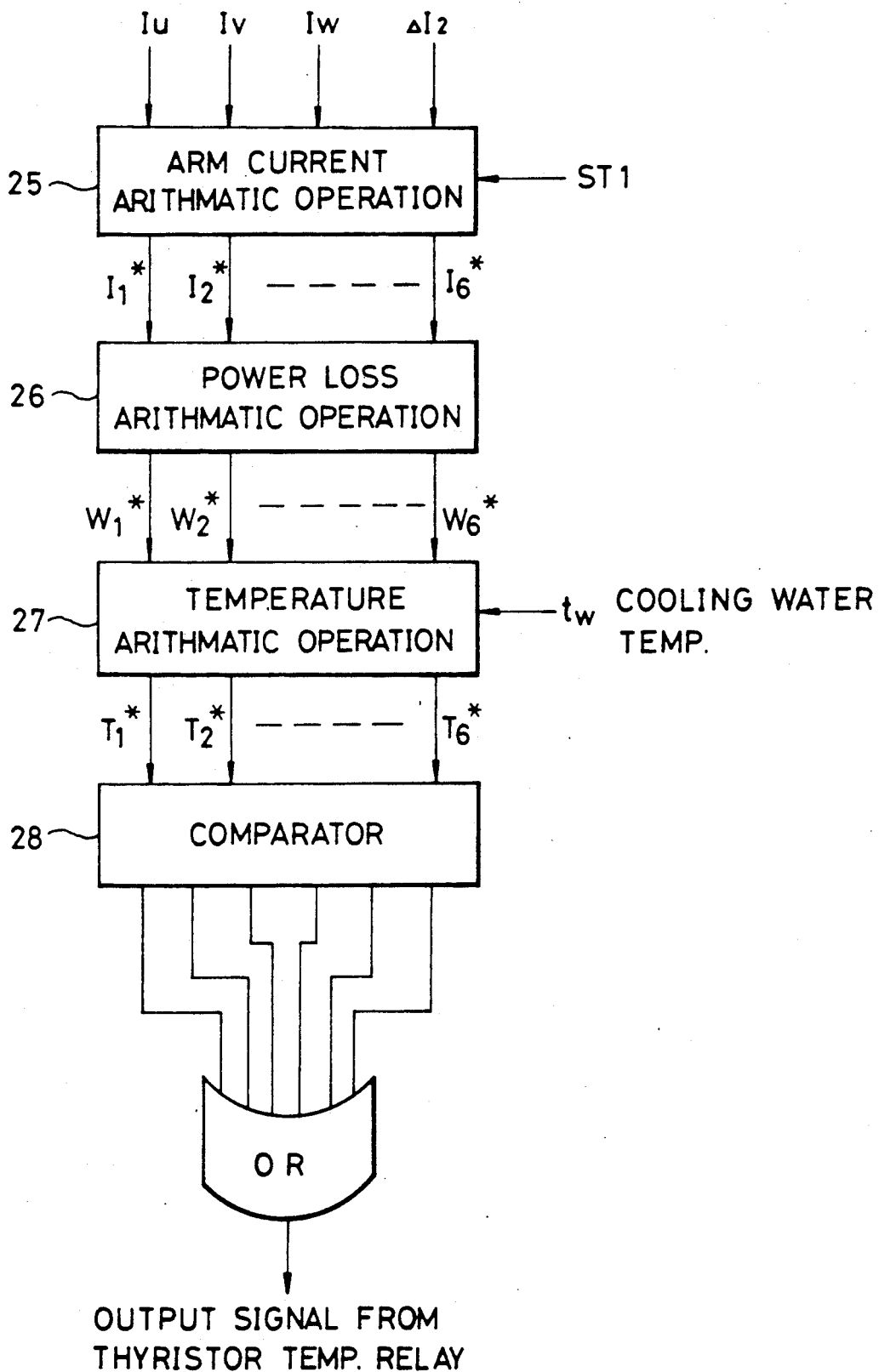
FIG. 11 is a block diagram representing the structure of still another thyristor temperature relay.

FIG. 11 shows still another embodiment of thyristor temperature relay 17, which can perform arithmetic operation of the temperature of each of thyristors TY1 to TY6.

Measurement of each arm current flowing through thyristor is described in the paper titled "The Control of Thyristors in the English Terminal Cross Channel Valves, Particularly During Forward Recovery", IEE Conf. 1981/205, p. 158 to p.163. In this paper it is taught that each arm current is determined with the aid of an associated shunt resistor; each arm current thus determined and cooling water's temperature are subjected to analogue-to-digital conversion; the digital data thus obtained are inputted into a microcomputer to perform arithmetic operations for determining the amount of heat generated by each thyristor and its junction temperature; and protection operation starts when the thermal calculation result is beyond a predetermined limit In the embodiment of FIG. 11 arm currents are determined in terms of Iu, Iv and Iw with the aid of the current transformers on the AC side. As shown in FIG. 11, the thyristor temperature relay is composed of arm current arithmetic operation section 25, power loss arithmetic operation section 26, temperature arithmetic operation section 27, and comparator 28.

Figure 12:
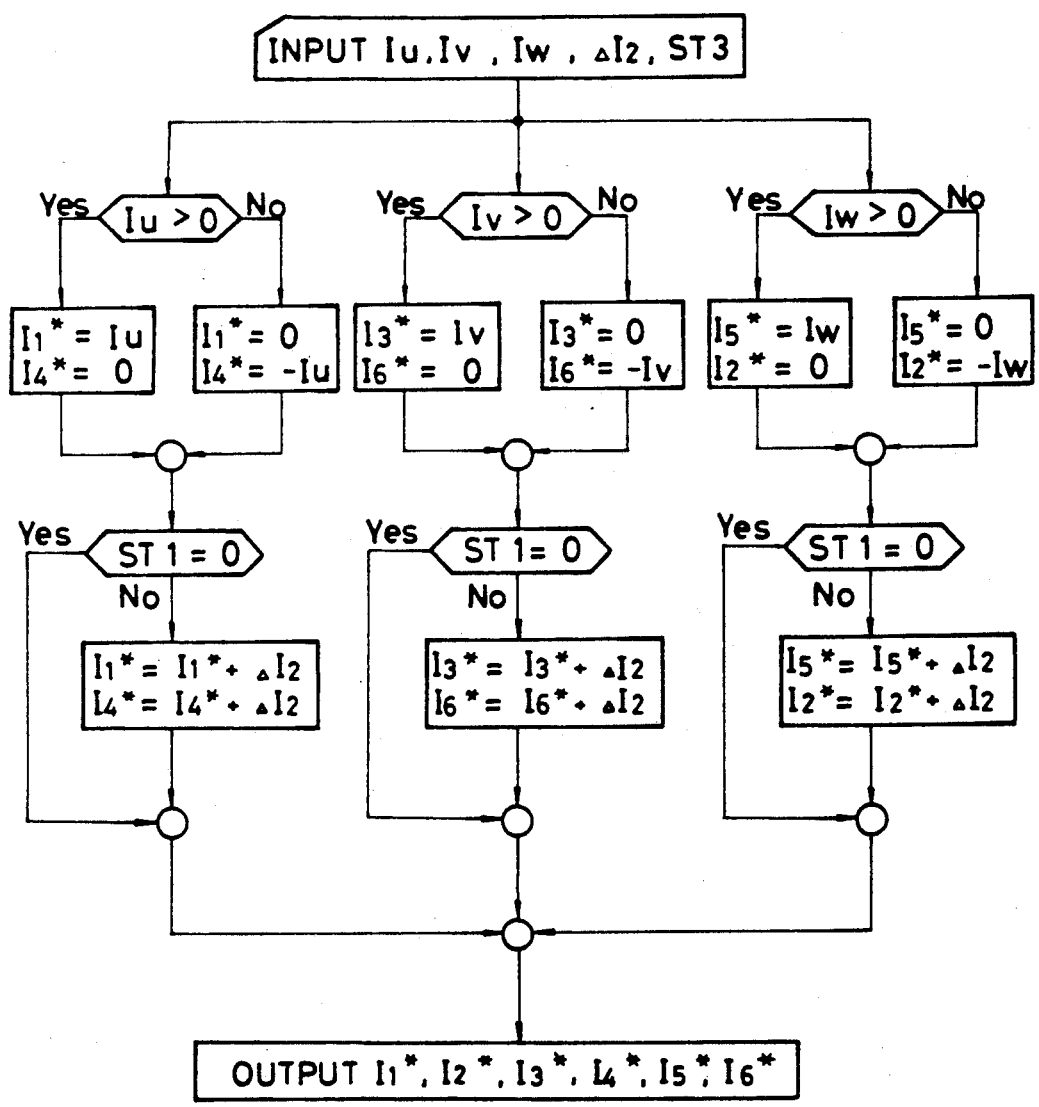
FIG. 12 is a flow chart representing the proceedings of the arithmetic operation in the thyristor temperature delay of FIG. 11.

FIG. 12 shows some details of arm current arithmetic operation section 25. As shown. thyristor currents $I_1^*$, $I_2^*$, $I_3^*$, $I_4^*$, $I_5^*$ and $I_6^*$ are presumed from the values and signs of Iu, Iv and Iw, and if the signal ST1 appearing at the output terminal of comparator 18 is Level High, $\Delta I_2$ will be added to the calculated arm currents flowing through TY1 to TY6.

Figure 13:
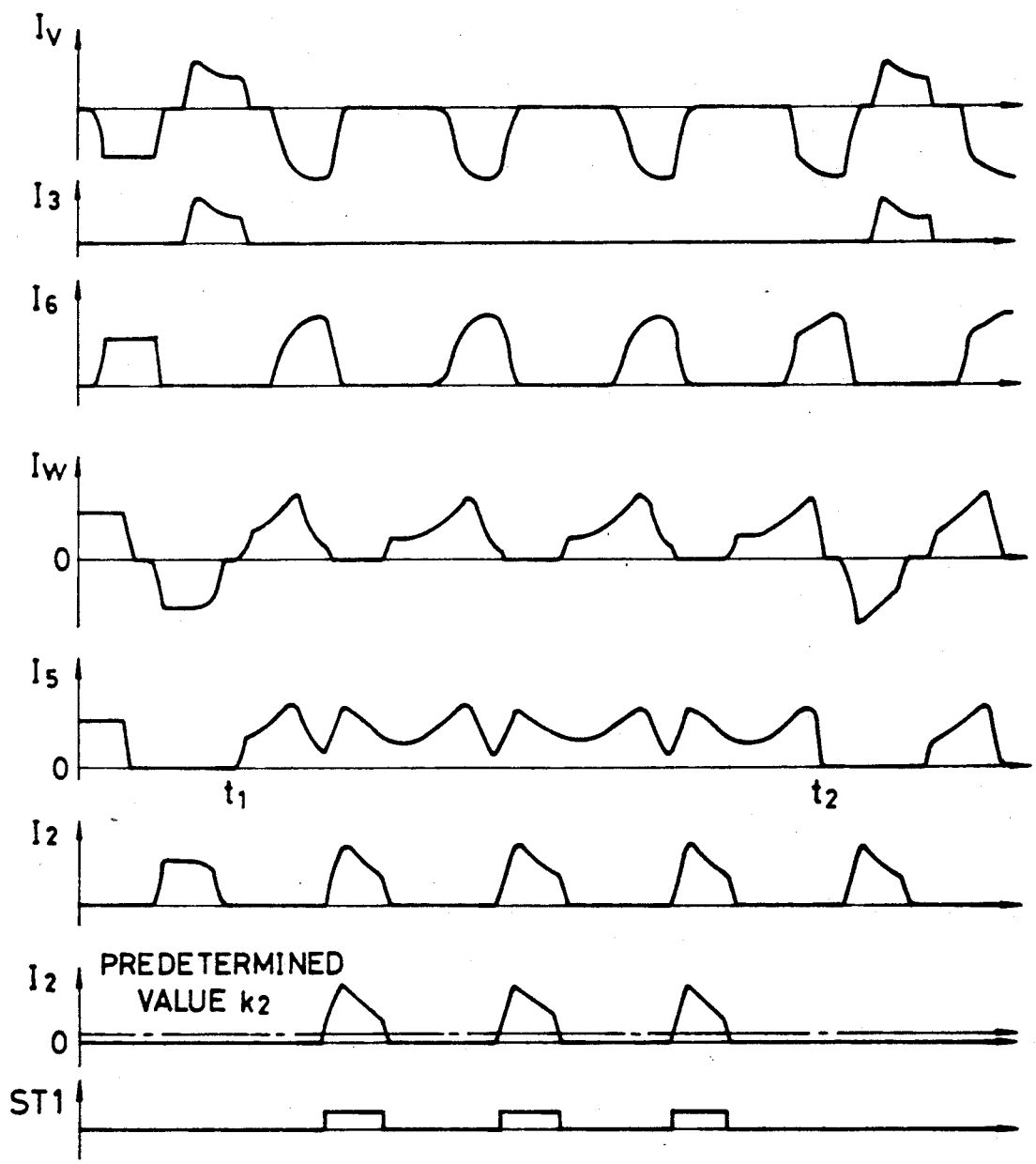
FIG. 13 shows waveforms from which the appropriateness of the proceedings of the arithmetic operation is proved.

FIG. 13 is waveforms from which the proceedings of the arithmetic operations as shown in FIG. 12 may be understood to be appropriate for the purpose In the figure commutation failure appears in TY5 from $t_1$ to $t_2$.

From comparison between actual arm current $I_2$, $I_5$ and currents Iw and Iz it is found that:

$$I_2{}^* = I_2 \text{ and } I_5{}^* = I_5.$$

On the other hand, $I_3$ and $I_6$, which are free of commutation failure, have an error of $\Delta I_2$, and accordingly the following inequalities will be held:

$$I_3{}^* \geq I_3 \text{ and } I_6{}I \geq I_6.$$

Such an error, however, is the result estimated on the basis of most unfavorable presumable situation, and will cause no adverse effect on the protection of power conversion system.

In this example thyristors' temperature prior to commutation failure is estimated, and therefore the protection level can be set regardless of load conditions, and accordingly margin can be advantageously reduced.

Figure 21:
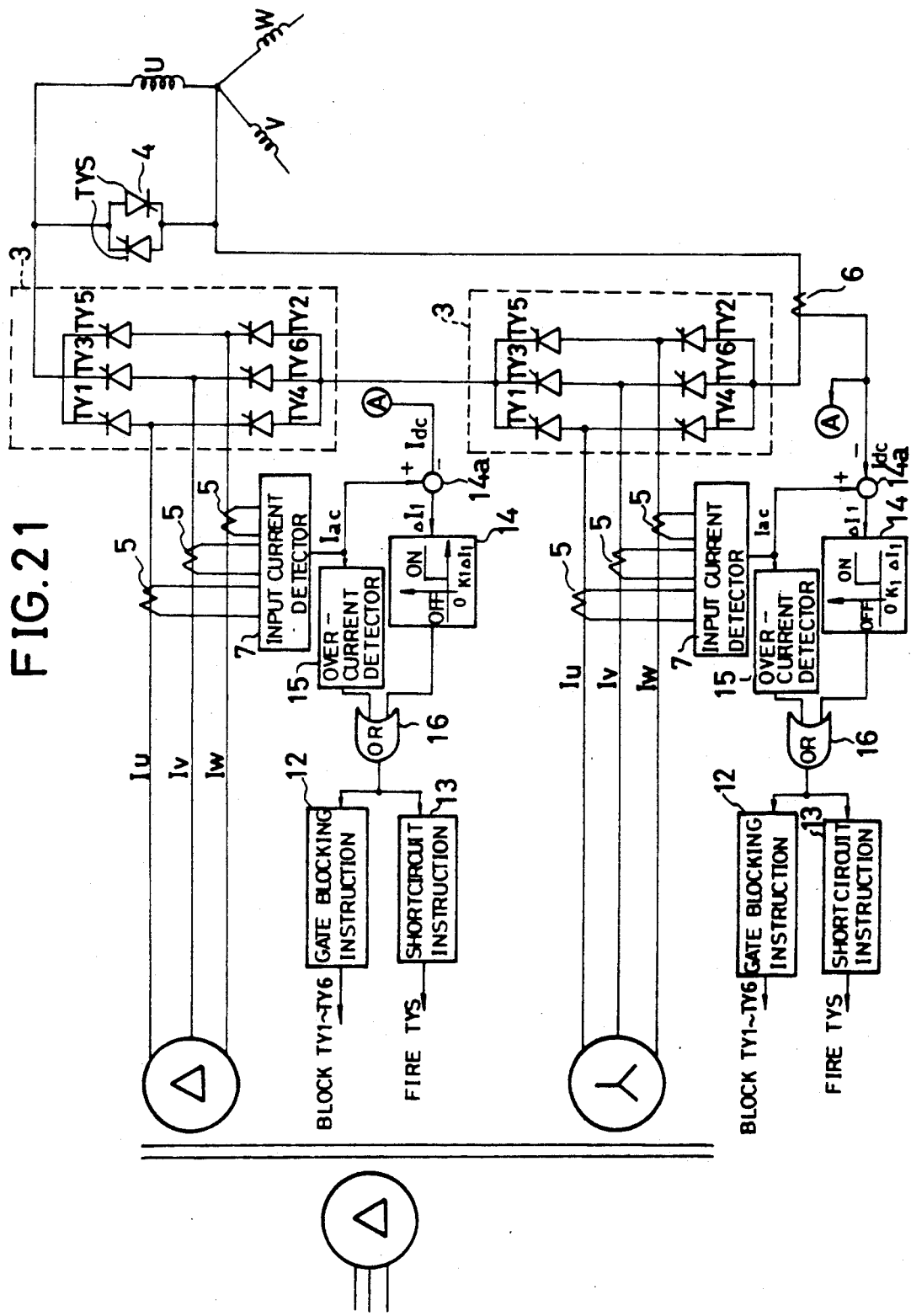
FIG. 21 shows the structure of a semiconductor electric power conversion system according to a fourth embodiment of the present invention.

FIG. 21 shows a semiconductor electric power conversion system according to the fourth embodiment of the present invention as comprising a series connection of two three-phase bridge circuits 3 each equipped with a protection unit. The protection unit is similar to the one as shown in FIG. 5, and the structure and operation of the protection unit is described earlier with reference to FIG. 5.

In the configuration as shown, a single DC current transformer 6 for detecting the DC output current Idc on the DC side is coupled to the series connection of two three-phase bridge circuits 3, and the signal representing the DC current is directed to deviation detection circuit 14a of each protection unit. As a matter of course each protection unit may be equipped with a DC current transformer.

Figure 22:
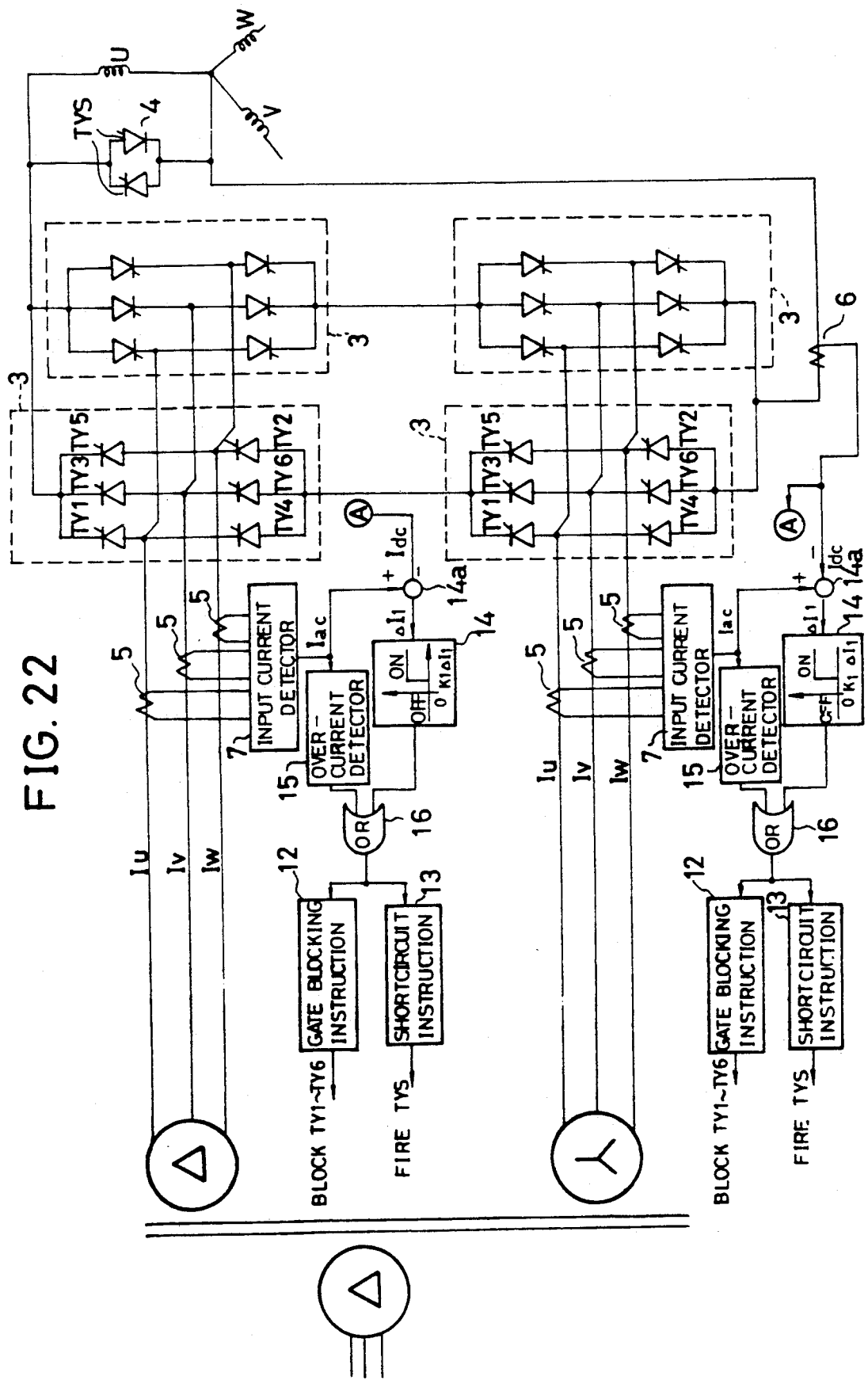
FIG. 22 shows the structure of a semiconductor electric power conversion system according to a fifth embodiment of the present inventions.

FIG. 22 shows a semiconductor electric power conversion system according to the fifth embodiment of the present invention as comprising a parallel-connection of two series-connections of two three-phase bridge circuit 3, connected in counter polarity This is commonly called "non-circular current type cycloconverter".

In the circuit configuration as shown in FIG. 22, there are two protection units each associated with the two three-phase bridge circuits which have an AC power supply in common. These protection units have the same structure as in FIG. 5, and therefore it is not necessary to describe its structure and operation.

In the configuration as shown, a single DC current transformer 6 is coupled to the counter parallel connection of the two series-connections each of the two three-phase bridge circuits 3 for detecting the DC output current Idc on the DC side, and the signal representing the detected DC current is directed to deviation detection circuit 14a of each protection unit. As a matter of course each protection unit may be equipped with a DC current transformer 6.

Also, in the configuration as shown, a set of three DC current transformers 5 are coupled to the two three-phase bridge circuits 3 which are connected to a common AC power supply, and the signals representing the AC current values thus detected are directed to the deviation detection circuit 14a of the protection unit. As a matter of course a set of current transformers may be provided to each three-phase bridge circuit 3. Also, a protection unit may be provided to each three-phase bridge circuit 3. In the power converter configurations according to the fourth and fifth embodiments of the present invention a reduced number of DC transformers and AC transformers are advantageously used.

The semiconductor electric power conversion systems described above can be partly modified, as for instance follows:

Input current detection circuit 7 may be composed of a sample-and-hold circuit for sampling AC input current at regular intervals, an analogue-to-digital convertor for converting the current thus sampled, a maximum value detector for determining the absolute values of the electric currents flowing in all phases and selecting the highest value, means for directing the signal representing the highest value to a subsequent stage, and a control for controlling these different units. These may be constructed in the form of integrated circuit.

Such input current detection circuit may have components allotted to each phase in independent form. Alternatively, they may be used in common according to time-division system.

The control may be equipped with a computer for performing necessary functions according to appropriate softwears. It may include a CPU for performing necessary arithmetic operations and controls, a program memory for storing programs according to which the operation of the CPU is controlled, a data memory for storing data which are to be processed by the CPU, a data memory for storing data which have been processed by the CPU, and an I/0 interface.

As for other units such as deviation detection circuit 14a, comparator 14, thyristor temperature relay 17, gate blocking instruction circuit 12 and shortcircuit instruction circuit 13 these may be made up by using digital circuits, particularly highly functional integrated circuits. Also, these units may be made up by using data processors or microcomputers.

A plurality of circuit components may use a data processor in common. For instance, a multiprocessor system may be used.

A protection unit whose structure is different from the ones as described above, may be equally used, provided that it attains the same function as in the embodiments of the present invention. It may have the combined functions of those of the protection units of the first and third embodiments.

The present invention can be equally applied to control of induction machines, synchronous machines, DC power system, AC-to-DC or DC-to-AC converter and other electric machines and apparatuses.

One example is an application to a valuable speed electric generator-and-motor, which comprises a dynamotor connected on its primary side to AC power supply and an electric power converter composed of power control elements parallel-connected in counter polarity to supply secondary current to the secondary of the dynamotor. This apparatus is appropriate for the variable speed running of a pumping water wheel, permitting the stable-controlling of effective and reactive powers even in case where sudden change is caused in the AC power supply. A semiconductor electric power conversion system may be used as an electric power converter in such valuable electric generator-and-motor.

As may be understood from the above, a separately excited type electric power conversion system according to the present invention can make a distinction between abnormal conditions caused by inner defects or faults and abnormal conditions caused by exterior disturbances, thereby permitting continuous running to the limit of endurance allowance, and accordingly improving the reliance of operation.

Also, in case where commutation failures are caused by external faults and where the operation is made to stop owing to the rise of thyristors' temperature, the electric power conversion system according to the present invention can be quickly restarted by bypassing with the aid of the shortcircuit switch, accordingly improving the reliance of the operation.

We claim:

1. A semiconductor electric power conversion system comprising a multi-phase bridge circuit composed of semiconductors having controllable firing capability and counter-block characteristics and an associated firing instruction circuit, comprising:
   an AC input current detection circuit including a plurality of rectifying circuits, respective ones of the plurality of rectifying circuits converting an AC input current of a respective phase of the multi-phase bridge circuit into an absolute value, and a highest value selection circuit for selecting a highest value of the converted absolute values;
   a DC output current detection circuit for detecting DC output current appearing on an output side of said bridge circuit;
   a firing blocking circuit for preventing signals appearing at an output terminal of said firing instruction circuit from being directed to said semiconductors; and
   an inner fault relay which is adapted to be actuated only if a difference (Iac−Idc) between the AC input current Iac from said AC input current detection circuit and the DC output current Idc from said DC output current detection circuit is positive in sign, and if the absolute value of the different is equal to or above a predetermined value, said inner fault relay being connected to said firing prevention circuit for actuating the same.

2. A semiconductor electric power conversion system comprising a multi-phase bridge circuit composed of semiconductors having controllable firing capability and counter-block characteristics and an associated firing instruction circuit, comprising:
   a shortcircuit switch connected across a DC output side of said bridge circuit, said shortcircuit switch being a semiconductor having controllable firing capability and counter-block characteristic;
   an AC input current detection circuit comprising a highest value selection circuit to which signals representing the absolute values of AC input currents flowing to said bridge circuit are directed;
   a DC output current detection circuit for detecting a DC output current appearing on an output side of said bridge circuit;
   a firing blocking circuit for preventing signals appearing at an output terminal of said firing instruction circuit from being directed to said semiconductors; and
   a thyristor temperature relay which is adapted to be switched in operation only if a difference (Iac−Idc) between the AC input current Iac from said AC input current detection circuit and the DC output current Idc from said DC output current detection circuit is negative in sign, and if the absolute value of the difference is equal to or above a predetermined value, said thyristor temperature relay being connected to said firing prevention circuit and said shortcircuit switch for actuating said firing prevention circuit, and at the same time firing said shortcircuit switch.

3. A semiconductor electric power conversion system comprising a multi-phase bridge circuit composed of semiconductors having controllable firing capability and counter-block characteristics and an associated firing instruction circuit, which further comprises:
   a protection apparatus including:
      means for detecting an AC input current value of each phase of said multi-phase bridge circuit and a DC output current in said bridge circuit; and
      means for obtaining absolute values of the AC input current values of the respective phases and for making a comparison between a highest one of the obtained absolute values of the AC input current and the DC output current and for commanding the interruption of the operation of said bridge circuit if the highest absolute value of the AC input current is formed to be equal to or larger than the DC output current.

4. A semiconductor electric power conversion system comprising a multi-phase bridge circuit composed of semiconductors having controllable firing capability and counter-block characteristic and an associated firing instruction circuit, which further comprises:
   a shortcircuit switch on a DC output side of said bridge circuit; and
   a protection apparatus including:
      means for detecting an AC input current value and a DC output current value in said bridge circuit; and
   means for making a comparison between the absolute value of the AC input current thus detected and the DC output current value and to allow continuous operation of said bridge circuit while the presumable temperature of said semiconductors remains below a predetermined limit in case where the DC output current is found to be equal to or larger than the absolute value of the AC input current, and to close said shortcircuit switch when the presumable temperature of said semiconductors rises to or above the predetermined limit and, at the same time, command the interruption of the firing of said semiconductors in said bridge circuit.

5. A semiconductor electric power conversion system comprising a multi-phase bridge circuit composed of semiconductors having controllable firing capability and counter-block characteristic and an associated firing instruction circuit, which further comprises:
   a shortcircuit switch on a DC output side of said bridge circuit; and
   a protection apparatus including:
      means for detecting an AC input current value and a DC output current value in said bridge circuit;
      means for making a comparison between the absolute value of the AC input current thus detected and the DC output current and to command the interruption of the operation of said bridge circuit if the absolute value of the AC input current is found to be equal to or larger than the DC output current; and means for allowing continuous operation of said bridge circuit while the presumable temperature of said semiconductors remains below a predetermined limit in case where the DC output current is found to be equal to or larger than the absolute value of the AC input current, and to close said shortcircuit switch when the presumable temperature of said semiconductors rises to or above the predetermined limit and, at the same time, command the interruption of the firing of said semiconductors in said bridge circuit.

6. A method of operating a semiconductor electric power conversion system having a multi-phase bridge circuit composed of semiconductors having controllable firing capability and counter-block characteristics and an associated firing instruction circuit, comprising the steps of:

detecting an AC input current value of each phase of said multi-phase bridge circuit and a DC output current value in said bridge circuit;

obtaining absolute values of the AC input current values of the respective phases of said bridge circuit and making a comparison between a highest absolute value of the AC input current value and the DC output current value; and commanding the interruption of the firing of at least said semiconductors in said bridge circuit if the highest absolute value of the AC input current value is found to be equal to or larger than the DC output current value in any phase, whereby dealing with abnormal conditions.

7. A method of operating a semiconductor electric power conversion system having a multi-phase bridge circuit composed of semiconductors having controllable firing capability and counter-block characteristic, a gate control circuit for commanding the firing of said semiconductor control elements, and a shortcircuit switch connected across the DC output side of said bridge circuit, comprising the steps of:

detecting an AC input current value and a DC output current value in said bridge circuit;

making a comparison between the absolute value of an AC input current and a DC output current; and allowing continuous operation of said bridge circuit to the temperature limit for the temperature of said semiconductors in said bridge circuit while the DC output current is found to be equal to or larger than the absolute value of the AC input current, and closing said shortcircuit switch when the temperature of said semiconductors rises above said temperature limit, and at the same time, commanding the interruption of the firing of said semiconductors in said bridge circuit.

8. A protection apparatus for use in a semiconductor electric power conversion system comprising a multi-phase bridge circuit composed of semiconductors having controllable firing capability and counter-block characteristics, a gate control circuit for commanding the firing of said semiconductor control elements, and a short circuit switch connected across the DC output side of said bridge circuit, which comprises:

means for detecting an AC input current in each phase of said multi-phase bridge circuit;

an AC input current detection circuit for determining the absolute value of each input current thus detected and for selecting a highest value Iac of all absolute values and for outputting a signal representing the highest value;

means for detecting a DC output current Idc in said bridge circuit;

means for determining a difference (Iac−Idc) between the AC input current Iac and the DC output current Idc; and relay means for preventing the firing of said semiconductors and closing the shortcircuit switch if the deference (Ias−Idc) is positive in sign and if the absolute value of the difference is equal to or larger than a predetermined value.

9. A protection apparatus for use in a semiconductor electric power conversion system comprising a multi-phase bridge circuit composed of semiconductor control elements having controllable firing capability and counter-block characteristic; a gate control circuit for commanding the firing of said semiconductor control elements; and a shortcircuit switch connected across a DC output side of said bridge circuit, which comprises:

means for detecting an AC input current in each phase of said bridge circuit;

an AC input current detection circuit for determining the absolute value of each input current thus detected to select the highest value Iac of all absolute values and output a signal representing the highest value;

means for detecting a DC output current Idc in said bridge circuit;

means for determining the difference (Iac - Idc) between the AC input current Iac and the DC output current Idc; and relay means for permitting continuous operation of said bridge circuit while the presumable temperature of said semiconductor control elements rises, but still remains below a predetermined temperature limit if the difference (Iac−Idc) is negative in sign and if the absolute value of the difference is equal to or larger than a predetermined value, and to close said shortcircuit switch and, at the same time prevent the firing of said semiconductor control elements if the presumable temperature of said semiconductor control elements rises to or above the predetermined temperature limit.

10. A method of operating a semiconductor electric power conversion system comprising a multi-phase bridge circuit including semiconductor control elements having controllable firing capability and reverse-blocking characteristic for respective phases of the bridge circuit, a shortcircuit switch connected at an output side of the bridge circuit, and a gate control circuit for commanding firing of the semiconductor control elements, which method comprises the steps of:

detecting AC input current values of the multi-phase bridge circuit and an output current value of the bridge circuit;

comparing one of the detected AC input current values and the output current value and for instructing at least interruption of the firing of the semiconductor control elements in the bridge circuit when the one AC input current value is larger than the output current value, for allowing the operation to continue up to a preliminary set limit of a temperature of the elements in the bridge circuit when the output current value is larger than the one AC input current value, and for closing the shortcircuit switch and instructing interruption of the firing of the semiconductor elements in the bridge circuit when the temperature of the elements exceeds the set limit, thereby enabling operation of the system while coping with possible abnormal conditions.

* * * * *